United States Patent [19]

Joshi

[11] Patent Number: 5,414,839

[45] Date of Patent: May 9, 1995

[54] HYBRID LOCK ESCALATION AND DE-ESCALATION PROTOCOLS

[75] Inventor: Ashok M. Joshi, Nashua, N.H.

[73] Assignee: Digital Equipment Corporation, Maynard, Mass.

[21] Appl. No.: 901,590

[22] Filed: Jun. 19, 1992

[51] Int. Cl.⁶ ............................................. G06F 12/00
[52] U.S. Cl. ................................ 395/600; 395/650; 395/725; 364/246.8; 364/281.3; 364/281.5; 364/281.6; 364/282.2; 364/283.2; 364/DIG. 1
[58] Field of Search ................. 364/DIG. 1, DIG. 2; 395/425, 600, 725, 650

[56] References Cited

U.S. PATENT DOCUMENTS

| | | | |
|---|---|---|---|
| 4,698,752 | 10/1987 | Goldstein et al. | 364/200 |
| 4,716,528 | 12/1987 | Crus et al. | 395/650 |
| 4,914,569 | 4/1990 | Levine et al. | 364/200 |
| 5,063,501 | 11/1991 | Jordan, Jr. | 395/725 |
| 5,063,503 | 11/1991 | Jordan, Jr. | 395/725 |
| 5,063,504 | 11/1991 | Jordan, Jr. | 395/725 |
| 5,119,490 | 6/1992 | Kurose | 395/600 |
| 5,247,672 | 9/1993 | Mohan | 395/650 |
| 5,285,528 | 2/1994 | Hart | 395/725 |
| 5,301,290 | 4/1994 | Tetzlaff et al. | 395/425 |
| 5,355,477 | 10/1994 | Strickland et al. | 395/600 |

OTHER PUBLICATIONS

Hobbs et al., "Rdb/VMS-A Comprehensive Guide," Digital Equipment Corporation, Maynard, Mass. (1991).

Joshi, "Adaptive Locking Strategies in a Multi-node Data Sharing Environment", Proceedings of the 17th International Conference on Very Large Data Bases, (Sep. 3-6, 1992), Barcelona, Spain, IEEE, pp. 181-192.

Lehman et al., "A Concurrency Control Algorithm for Memory-Resident Database Systems," FODO (Jun. 1989), pp. 1-15.

Snaman et al., "The VAX/VMS Distributed Lock Manager," Digital Technical Journal, No. 5, Maynard, Mass. (Sep. 1987), pp. 29-44.

Bernstein et al., "Concurrency Control and Recovery in Database Systems", Addison-Wesley (1987), pp. 58-78.

Gray, Operating System: An Advanced Course, Lecture Notes in Computer Science 60, Springer-Verlag, New York (1977), pp. 394-459.

Bayer et al., "Concurrency of Operations of B-Trees," Acta Inf. 9, 1 (1977), pp. 129-139.

*Primary Examiner*—Thomas G. Black
*Assistant Examiner*—Maria N. Von Buhr
*Attorney, Agent, or Firm*—Arnold, White & Durkee

[57] ABSTRACT

Requests for memory locks upon nodes in a multi-level resource hierarchy of a computer system are granted and denied by a hybrid escalation/de-escalation protocol that dynamically modifies the resource hierarchy so that lock escalation may restrict the extent of the hierarchy. Each of the leaf-level nodes, for example, is identified by a flag indicating whether or not it is possible to further refine a lock on the node by de-escalation. During escalation from a lower level of the hierarchy to a higher-level node, the flag for the higher-level node is set to restrict the extent of the hierarchy and to free-up memory previously allocated to descendants of the higher-level node. In a specific embodiment, the lock protocol attempts to place a strong lock at the highest possible node in the portion of the resource hierarchy including an object to be locked, and also records in memory a leaf node instance for the object. Another conflicting request, however, may cause de-escalation of the strong lock toward the leaf-levels of the hierarchy. Escalation of leaf-level locks is attempted just before the lock protocol would otherwise record a leaf node instance for an additional object. Lock escalation is performed by recording a leaf node instance for the ancestor node and de-allocating the memory that was used to store leaf-level node instances of the descendants of the ancestor.

17 Claims, 9 Drawing Sheets

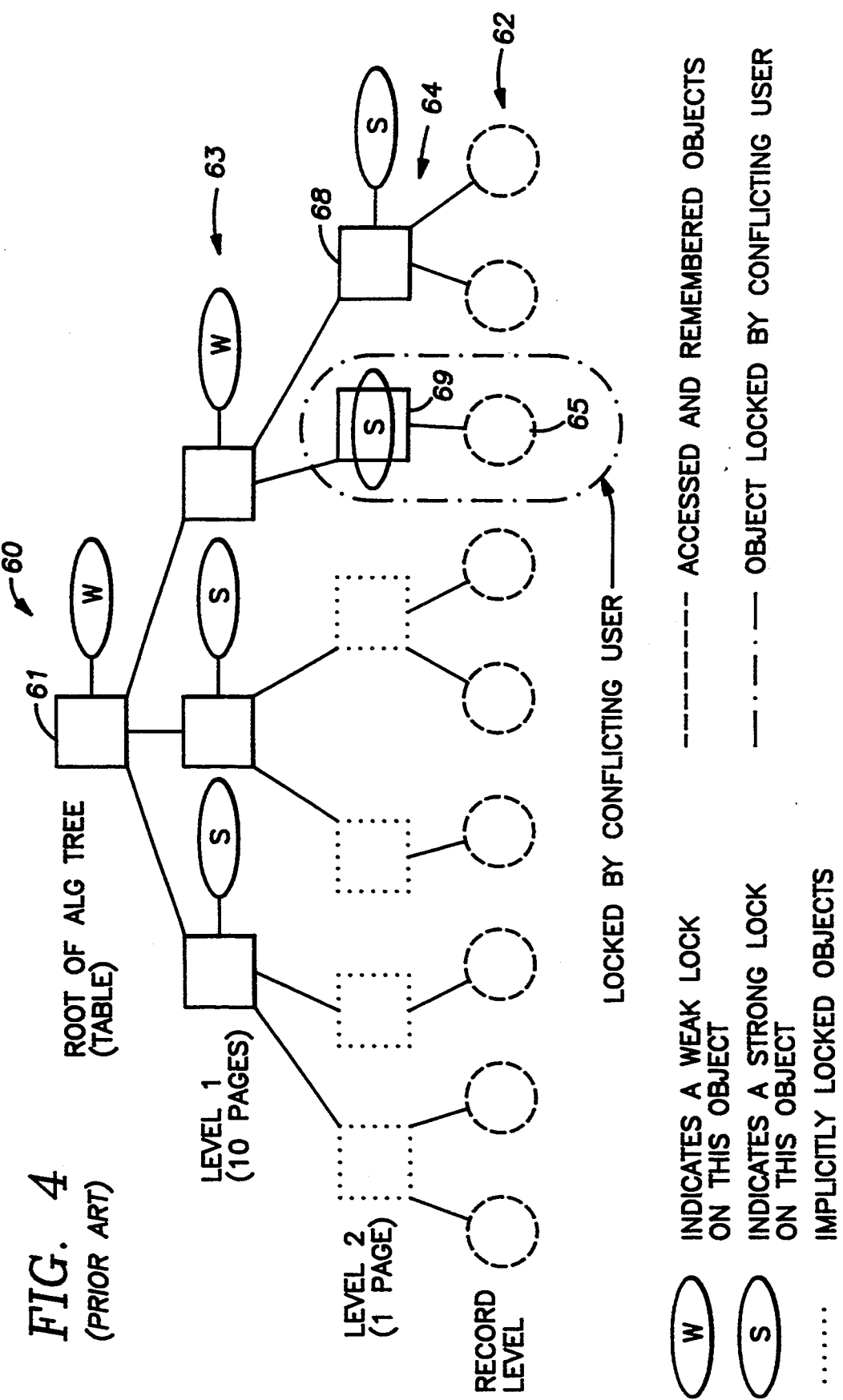

HYBRID LOCK ESCALATION AND DE-ESCALATION PROTOCOLS

BACKGROUND OF THE INVENTION

1. Field of the Invention

The present invention relates generally to transaction processing, and more particularly to a transaction processing system which uses locking as a concurrency control mechanism. Specifically, the present invention relates to a database system that uses lock escalation and de-escalation protocols.

2. Description of the Background Art

A desirable feature of a computing system is the ability to recover from partial system failures that may interrupt memory write operations. If an application program has a memory update operation in progress at the time of the system failure, it is possible that a memory record will become erroneous. To enable the recovery of memory records after a partial system failure, it is necessary for the database system to keep backup copies of the records in nonvolatile memory. When the computing system is restarted, the memory records to be recovered are replaced with the backup copies.

To facilitate the making of backup copies and the recovery of memory records, the database system typically provides an established set of logging and recovery procedures that can be invoked or called from an application program to define a "recovery unit." The recovery unit consists of a set of "before images" and a set of procedures for installing these "before images" to corresponding non-volatile data records. All of the "before images" in the "recovery unit" must be installed before the corresponding data records are made available for subsequent processing. The "before images" in the "recovery unit" usually are the updates of operations in a single "transaction." Upon recovering from a partial system failure, inspection of the nonvolatile memory will reveal that the operations in the single "transaction" are either all completed, or none of them are completed.

The operations in a single transaction may modify a number of files, and the files may be shared by other processes. During the transaction, the files may be inconsistent for a time, although the files will be consistent upon completion of the transaction. A typical example is a transfer of funds from one account to another, in which a first account is debited, and at a slightly later time, another account is credited. During the interim, the two accounts are inconsistent because the sum of the two accounts does not represent the total funds in the two accounts. Due to inconsistency when files are being modified by a transaction, it is desirable to prevent other users or processes from accessing the files until the modification is finished.

Transactions are typically initiated in transaction processing systems in such a way that the execution of a second transaction is begun before the results of a first transaction are committed. To ensure correctness and ease of recovery, the second transaction is usually precluded from reading any updates of the first transaction before the first transaction commits. In a data base system, for example, a transaction places "write locks" on any data base records that are modified by the transaction. To ensure consistency of data read by a transaction, the transaction may also place "read locks" on any data base records that are read by the transaction. These read locks and write locks are held until the end of the transaction. Just after the updates of the transaction are committed, the locks are released. This well-known two-phase locking protocol ensures correctness and ease of recovery as described in Bernstein et al., *Concurrency Control and Recovery in Database System*, Addison-Wesley, 1987, pp. 58–78.

In multi-processing database systems, such as the "Rdb/VMS" (Trademark) database system sold by Digital Equipment Corporation, a "lock manager" is used which maintains a lock data structure including a hash table index to a cache of locks. Before a record is fetched, the cache of locks is indexed in order to determine whether a record is already locked, and to lock a free record to be updated.

The RdB/VMS database system is described in Hobbs and England, *Rdb/VMS—A Comprehensive Guide*, Digital Press, Digital Equipment Corp., Maynard, Mass. (1991); and Ashok Joshi, "Adaptive Locking Strategies in a Multi-Node Data Sharing Environment," Proceedings of the 17th International Conference on Very Large Data Bases, IEEE, Barcelona, Spain, Sep. 3–6, 1991, pp. 181–192. The Rdb/VMS database system uses the "lock manager" of the "VMS" (Trademark) operating system sold by Digital Equipment Corporation. The VMS lock manager is further described in Snaman and Thiel, "The VAX/VMS Distributed Lock Manager," *Digital Technical Journal*, No. 5, Digital Equipment Corp., Maynard, Mass. (September 1987), pp. 29–44.

Lock managers typically support resource hierarchies in order to provide high concurrency as well as good performance. Coarse granularity locks reduce the locking overhead at the expense of concurrency. Fine granularity locks improve concurrency at the cost of increased locking overhead such as larger lock tables and more calls to the lock manager. To deal with these problems, locking protocols typically use techniques that dynamically adjust the granularity of locking. One technique, known as lock de-escalation, starts with coarse granularity, and refines the granularity in response to locking requests by conflicting users. Another technique, known as lock escalation, starts with the finest granularity, and when there are a relatively large number of fine grain locks, the fine grain locks are exchanged for a single lock at the next higher level in the resource hierarchy, so long as the exchange would not introduce conflict or deadlock.

The "Rdb/VMS" database system, for example, uses multigranularity locking techniques. Records within a table are grouped into a tree structure called the "adjustable lock granularity tree" (ALG). This tree organizes the records into varying levels of granularity starting with the root of the tree being the entire table and the leaves being the individual records. The number of levels in the tree, as well as the successive refinements of granularity at each intermediate level, can be defined by the data base administrator.

The "Rdb/VMS" database system uses the following lock de-escalation protocol. Whenever a record lock is requested, the lock protocol attempts to acquire a strong lock on the highest ancestor of the record in the ALG tree. If it succeeds in obtaining the strong lock, all descendants of that node are implicitly locked. When individual records are accessed, it is necessary to remember each record that has been accessed so that it is possible to later de-escalate the high level lock to a lower level, if necessary. If the amount of conflict increases, it is possible to perform de-escalation and acquire explicit record locks.

Lock escalation has also been proposed for use with multigranularity locking, as described in Bernstein et al., *Concurrency Control and Recovery in Database Systems*, Addison-Wesley, 1987, pp. 69–77. On page 75, Bernstein et al. observe that a system that employs multigranularity locking must decide the level of granularity at which a given transaction should be locking data items. Fine granularity locks are no problem, because the transaction manager or scheduler simply requests them one-by-one as it receives operations from the transaction. Coarse granularity locks are another matter. A decision to set a coarse lock is based on a prediction that the transaction is likely to access many of the data items covered by the lock. A compiler may be able to make such predictions by analyzing a transaction's program and thereby generating coarse granularity lock requests that will be explicitly issued by the transaction at run time. If transactions send high level (e.g., relational) queries to the transaction manager, the transaction manager may be able to tell that the query will generate many record accesses to certain files.

Bernstein et al. further say that the past history of a transaction's locking behavior can also be used to predict the need for coarse granularity locks. The scheduler may only be able to make such predictions based on the transaction's recent behavior, using a technique called escalation. In this case, the transactions start locking items of fine granularity (e.g., records). If a transaction obtains more than a certain number of locks of a given granularity, then the scheduler starts requesting locks at the next higher level of granularity (e.g., files), that is, it escalates the granularity of the locks it requests. The scheduler may escalate the granularity of a transaction's lock requests more than once.

Lehman and Carey have proposed to allow the granularity of locking to vary dynamically in response to changes in the level of inter-transaction conflicts. As described in Lehman and Carey, "A Concurrency Control Algorithm for Memory-Resident Database Systems," *FODO* June 1989, a proposed locking algorithm uses two locking granule sizes: relation-level locks and record-level locks. Locking at the relation level is much cheaper than locking at the record level, so it is the preferred method when a fine granularity of sharing is not needed. When several transactions desire access to a relation that is locked with a relation-level lock, the relation lock is de-escalated into a collection of record locks; the higher cost for record-level locking is then paid, but the level of sharing is increased. To allow for the possibility of relation lock de-escalation, record-level write sets and read predicate lists for transactions are kept in a control block associated with each accessed relation so that they may be converted into record locks if the need arises. When fine granularity locks are no longer needed, record-level locks are escalated back into relation-level locks. Certain operations that require the use of an entire relation will be able to force lock escalation to the relation level and then disable lock de-escalation until they have completed.

SUMMARY OF THE INVENTION

It has been discovered that the multi-granularity record locking schemes introduced above have performance limitations and high memory requirements in low contention situations. Whenever a resource is logically locked, lock de-escalation protocols have to remember every leaf-level entity that has been implicitly locked so that finer granularity locks can be obtained on demand. This leads to large memory requirements even in low conflict situations.

Briefly, in accordance with the present invention, a hybrid escalation/de-escalation lock protocol dynamically modifies the frontier of a multi-level resource hierarchy so that the extent of the hierarchy becomes more restricted during de-escalation. Each of the nodes in the hierarchy, for example, is identified by a flag indicating whether or not it is possible to further refine a lock on the node by de-escalation to finer-level locks. During escalation from a lower level of the hierarchy to a node at a higher level, the flag for the node at the higher level is set to restrict the extent of the hierarchy and to free-up memory previously allocated to remember the implicitly locked descendants of the node at the higher level. This dynamic modification of the frontier of the resource hierarchy reduces memory usage and locking overhead without sacrificing concurrency.

In a specific embodiment, when a first transaction requests a lock on a first object in a previously unlocked portion of a resource hierarchy, the lock protocol places a "strong" lock at the highest possible ancestor node of the object to be locked, and also records an implicit lock for the object. When a second concurrent transaction later requests a lock on a second object in the same resource hierarchy, the lock protocol attempts to place a "strong" lock on each of a pair of highest lower-level nodes, one of which is an ancestor of the first object but not the second object, and the other of which is an ancestor of the second object but not the first object. If this attempt is successful, the conflict can be resolved by a process of de-escalation. The strong locks are placed on the pair of highest lower-level nodes. The first lock is owned by the first transaction, and the second lock is owned by the second transaction. The lock protocol then demotes the strong lock of the first transaction to a weak lock, and records in memory an implicit lock for the second object. This lock de-escalation may continue toward the leaf-levels of the hierarchy. In other words, a lock at a leaf level cannot be demoted.

In addition, lock escalation is attempted just before the lock protocol would otherwise record an implicit lock for an additional object. In the specific embodiment, when recording of the implicit lock would otherwise increase the number of children of a strongly locked node, the lock protocol checks if all or a majority of the children of the strongly locked node are implicitly locked. If so, then the lock protocol marks the strongly locked node as a leaf node (i.e., non de-escalatable) and frees up the memory that was used to remember the implicitly locked children nodes. This marking of the strongly locked node as a leaf node dynamically restricts the resource hierarchy, and this restriction is maintained until the lock on the leaf node is released when the transaction owning the lock is terminated. At this time, the "leaf flag" of the node is cleared.

In short, lock de-escalation is triggered by contention from conflicting users. This reduces the number of locks requested per transaction in a multi-user environment. Lock escalation is triggered when a substantial number of children have implicit locks. The resource hierarchy is dynamically restricted during lock escalation to reclaim memory space. Therefore, concurrency control, with reduced memory requirements, is provided in a very large database environment. Database scans on very large tables of records can be handled with substantially reduced memory requirements.

BRIEF DESCRIPTION OF THE DRAWINGS

Other objects and advantages of the invention will become apparent upon reading the following detailed description and upon reference to the drawings in which:

FIG. 4 is a schematic diagram of the lock hierarchy of FIG. 3 after lock de-escalation to accommodate a new conflicting user;

Figure 1:
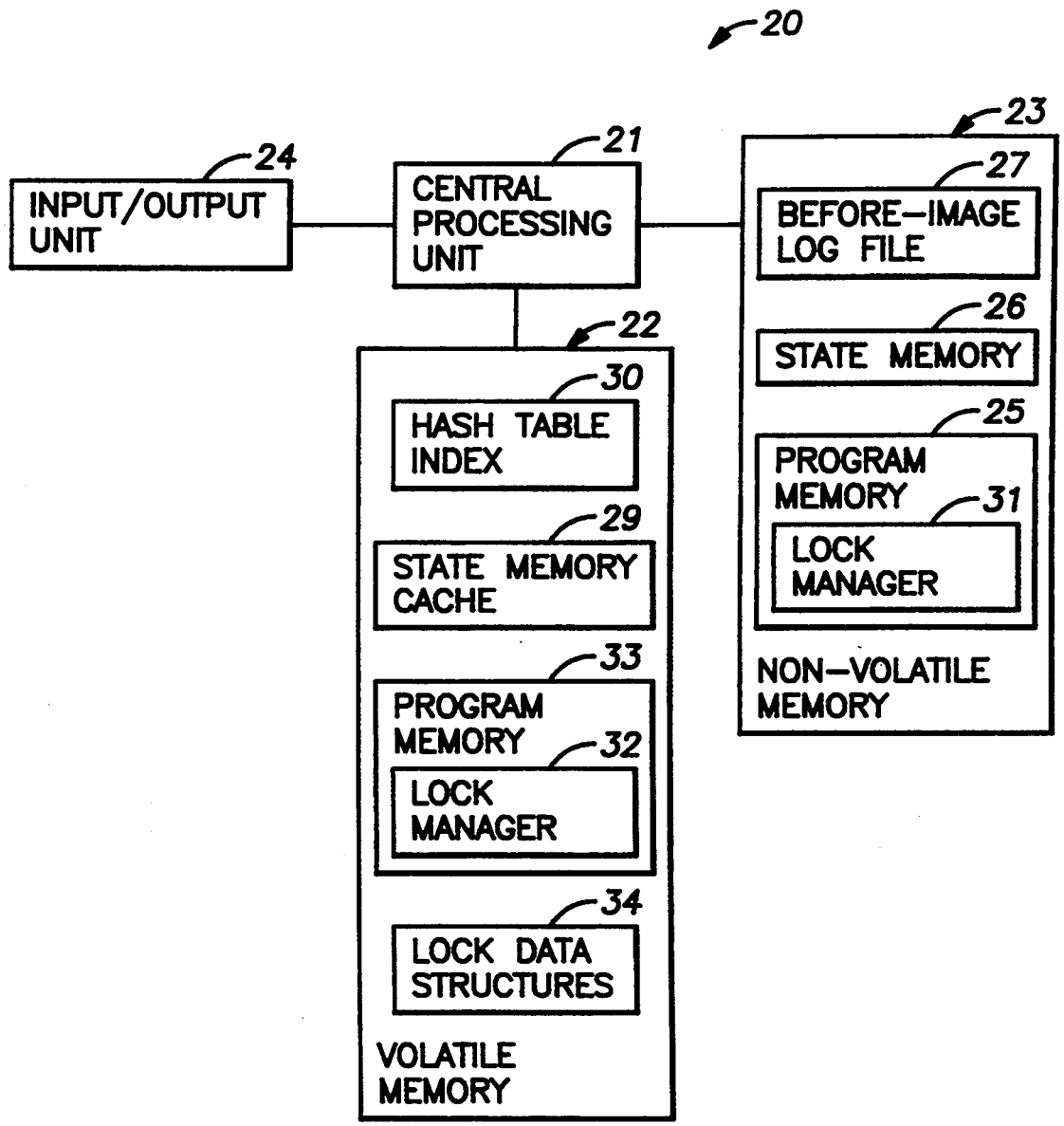
FIG. 1 is a block diagram of a digital computer configured for transaction processing.

While the invention is susceptible to various modifications and alternative forms, a specific embodiment thereof has been shown by way of example in the drawings and will be described in detail herein. It should be understood, however, that it is not intended to limit the invention to the particular form disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Turning now to FIG. 1, there is shown a block diagram generally designated 20 of a digital computer configured for transaction processing. The computer 20 includes a central processing unit 21 for executing programmed instructions; a volatile random access memory 22 for holding instructions or data; a non-volatile memory 23 such as a hard disk drive; and an input/output unit 24. The non-volatile memory 23 includes a program memory 25 in which programs are stored. Typically, the digital computer 20 executes programs which have been transferred from the program memory 25 to a program memory area 33 of the volatile random access memory 22. For practicing the present invention, for example, a "lock manager" program 31 is read from non-volatile memory 23 and loaded into an area 32 of volatile memory.

A common problem associated with the digital computer 20 is the likelihood that the execution of instructions by the central processing unit will become disrupted due to a hardware failure, software error or power failure. A power failure, for example, will cause the disappearance of data and programs stored in the volatile random access memory 22. The problem of the loss of data in the volatile random access memory 22 due to a power failure can be solved by storing back-up copies of data in the non-volatile memory 23. The back-up copies, however, must be made in such a way that considers the possibility of failure during a write operation to the non-volatile memory 23.

To deal with the problem of possible failure when writing to non-volatile memory, there has been established a method of programming called "transaction processing" which guarantees that a portion of the non-volatile memory (referred to hereinafter as "state memory" 26) will either be unaffected by a transaction or will be properly updated by the transaction, in the presence of the failures. Transaction processing is based upon the technique of making a back-up copy (for example in the log file 27) before the updates of a transaction are written to state memory.

It is assumed that certain addressable units of data, referred to herein as "records", can be written to and read from the non-volatile memory. In addition, it is assumed that the log file 27 is updated in an "atomic" fashion such that when a write operation of a record to a log file is interrupted by a failure such as a power failure, the log file will be found either in its original state, or in a state having a correct copy of the record properly written into the log file. This condition of atomicity is guaranteed by the operating systems and non-volatile memories of most computers. Moreover, for computers (such as some inexpensive "personal" computers) in which the operating system and non-volatile memory does not guarantee atomicity of write operations to non-volatile memory, it is possible to use a well-known protocol to guarantee atomicity of the write operations. In this protocol, a record is first written to a back-up area of non-volatile memory, next a flag is set in non-volatile memory, then the record is written into the desired location of non-volatile memory, and finally the flag is cleared in non-volatile memory. When recovering from a failure, the flag is read from the non-volatile memory, and when the flag is found to be set, the write operation is re-done by copying the record from the back-up area of non-volatile memory to the desired location of non-volatile memory, and then the flag is cleared in non-volatile memory.

It is also assumed that after a failure, it is possible to find the end of a log file. This could be done by updating an end-of-file pointer in the log file header each time that the log is updated. Preferably, however, the end of the log file is tagged so that it can be found by a quick search, without requiring the log file header to be updated each time that the log is updated. Each bit the log file, for example, is initially set to a logical one, so that the end of the file can be found when a string of logical ones is found during the search.

Whenever a transaction specifies a read of state memory 26, the non-volatile state memory 26 could be read. Unfortunately, conventional non-volatile memories such as hard magnetic discs have a very long access time compared to the access time of conventional volatile memory 22 such as dynamic random-access memory. Therefore, it is conventional to cache copies of state memory records in a state memory cache 29 in the volatile memory 22. The copies of state memory records presently resident in the state memory cache 29 are indexed in a hash table index 30.

In the digital computer 20, it is conventional to distribute the processing of transactions in such a way that the execution of a second transaction is begun before the results of a first transaction are committed. The scheduling of operations for the transactions is typically performed by a multi-tasking or multi-processing operating system program that services a transaction queue. In such a system, the transaction at the head of the queue is given priority and is processed unless this transaction at the head of the queue must wait for completion of an input/output operation or a memory access operation to non-volatile memory. In this situation, the transaction having priority may return execution to the operating system, and the operating system will pass execution to the next transaction having priority. Upon completion of the input/output or memory access operation, however, an input/output or memory interrupt will occur, causing execution to be interrupted in favor of an interrupt handler that will return execution to the operating system. The operating system will then transfer execution to transaction at the head of the queue, which was waiting for the completion of the input/output or memory access operation. In this fashion, the resources of the computer 20 are used more effectively. Because multi-tasking and multi-processing operating systems are well known in the art and are available commercially from the major computer manufacturers, the operating system program for the computer 20 will not be described in further detail. Further details, however, may be found in Hobbs and England, *Rdb/VMS—A Comprehensive Guide*, Digital Press, Digital Equipment Corp., Maynard, Mass. (1991).

To ensure ease of recovery and correct results from interleaved executions in the situation where a second transaction is begun before a first transaction commits, the second transaction is usually precluded from reading any updates of the first transaction before the first transaction commits. In the computer 20, for example, a transaction places "write locks" on the state memory records to be modified by the transaction, and these "write locks" are removed when the transaction is committed, as further described below with reference to FIG. 2. A "write lock" prevents any other transaction from reading or writing to the locked record.

To ensure consistency of data read by a transaction, the transaction places "read locks" on any state memory records that are read by the transaction. A "read lock" prevents any transaction from writing to the locked record.

Figure 2:
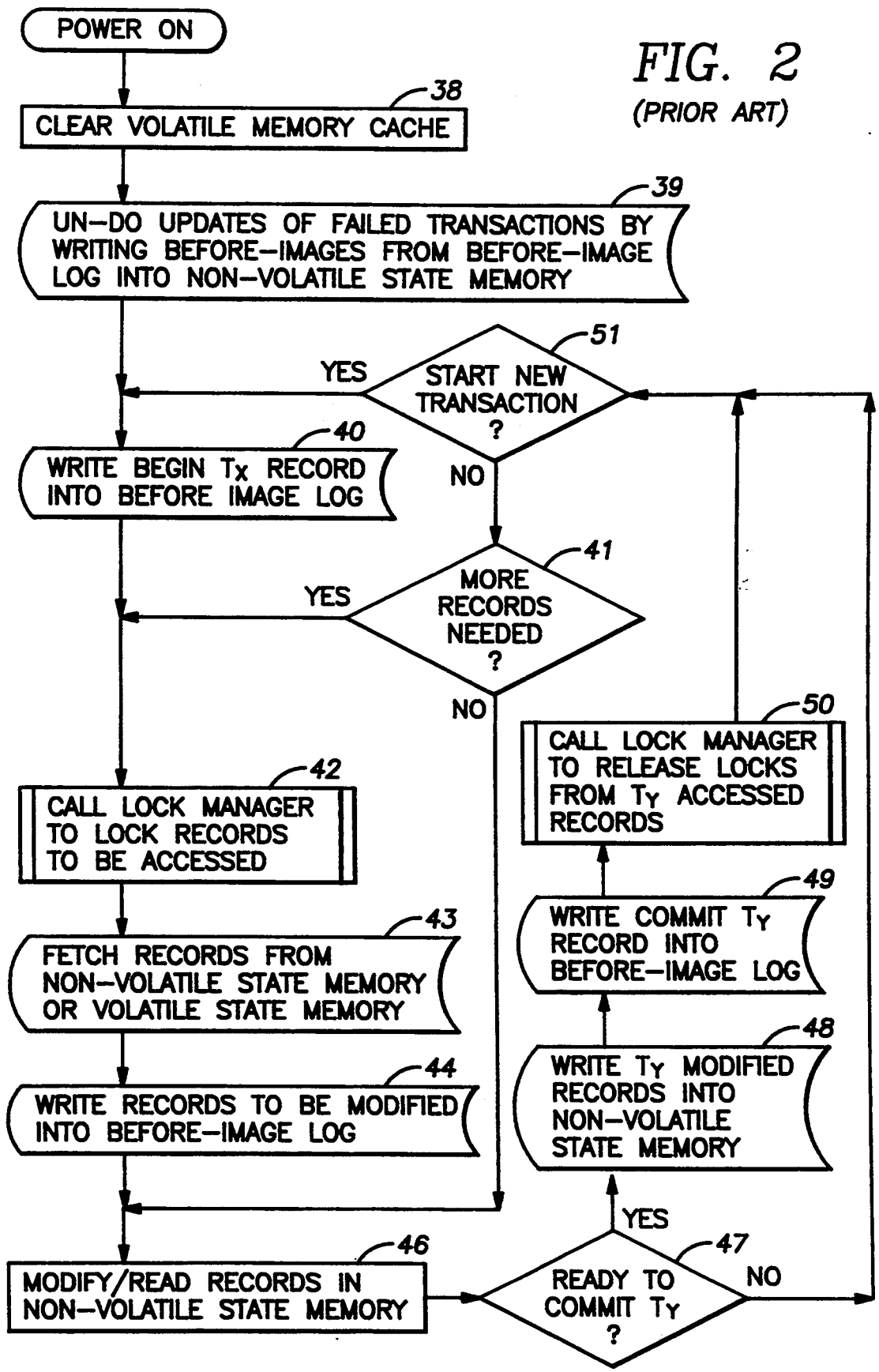
FIG. 2 is a flowchart of a procedure for performing transaction processing in the computer of FIG. 1 and using an "undo" recovery method.

Turning now to FIG. 2, there is shown a flowchart of the operation of the computer 20 for processing transactions when using a conventional "undo" recovery procedure. When the computer (20 in FIG. 1) is turned on, for example after a power failure, execution by the central processing unit (21 in FIG. 1) begins in the first step 38. In step 38, the state memory cache is cleared (by clearing the hash table index 38 in FIG. 1). Then in step 39, the central processing unit 21 reads the before-image log file (27 in FIG. 1) to un-do the updates of any failed transactions (i.e., the transactions that had begun but had not yet committed at the time that the failure interrupted the processing of the transactions). In particular, the end of the before-image log file is found, and while reading the before-image log file in reverse chronological order, the before-images of the updated records are copied to the non-volatile state memory (26 in FIG. 2).

It is possible to log the before images of a number of different transactions in the same before-image log file. In this case, for example, the before-images of the updated records are copied to the non-volatile state memory until a "commit" record is found. The commit record, for example, identifies a transaction that committed, and also includes an "active" list of transactions that were uncommitted at that time. This list is saved, and while continuing to read the before-image file in reverse chronological order, only the updates of the uncommitted transactions need be copied to the non-volatile state memory. Moreover, the beginning of a transaction could be logged in the before-image log by a "begin transaction" record. Upon reaching a "begin transaction" record in the before-image log, the transaction for which preparation began is removed from the "active" list, and when the "active" list becomes empty, step 42 is finished.

Preferably, however, a separate before-image file is allocated to each process in a multi-processing system, and the file for each process contains before-images for the currently active transaction of the process. After the transaction commits, its log of before-images is no longer needed, and the before-image log file is truncated for re-use by the next transaction of the process. No "commit record" is needed, because the before-image log file will be empty until the file is re-used by another transaction. This permits the recovery of a single process that fails in a multi-processing system. In this case, the entire before-image log file for the failed process is scanned backwards to recover and un-do the effects of a failed transaction for the failed process. To recover from all interrupted processes in the case of a power failure, the operating system maintains in non-volatile memory a list of active processes. Therefore, upon recovery from a power failure, this list of processes that were active is accessed to find the interrupted processes, and then the before-image log file of each interrupted process is scanned to un-do the effects of each failed transaction.

Once the non-volatile state memory has been restored, transaction processing can resume in step 40. In step 40, a "begin" record for a selected transaction Tx is written into the before-image log. In step 42, the "lock manager" program (32 in FIG. 1) is called to check the availability of records to be accessed by the current transaction. A multi-processing operating system (such as the VMS operating system sold by Digital Equipment Corporation) typically provides such a "lock manager". The VMS lock manager is further described in Snaman and Thiel, "The VAX/VMS Distributed Lock Manager," *Digital Technical Journal*, No. 5, Digital Equipment Corp., Maynard, Mass. (September 1987), pp. 29–44; and Ashok Joshi, "Adaptive Locking Strategies in a Multi-node Data Sharing Environment," Proceedings of the 17th International Conference on Very Large Databases, Barcelona, Spain, IEEE, Sep. 3-6, 1991, pp. 181-192.

The lock manager maintains lock data structures (34 in FIG. 1) such as a hash index table to a cache of locks. In step 42, the cache of locks is indexed before a record is fetched in the following step 43, in order to determine whether a record to be accessed by the current transaction is already locked, and to lock a free record to be updated. Such a lock manager is desirable in multi-processing systems to allow correct interleaved execution. If a record to be modified by the current transaction is already locked, then the operating system is invoked to interrupt processing of the current transaction requesting the lock, and to begin or continue processing of another transaction, such as the transaction having locked the record. Otherwise, the record is locked for the current transaction. Read locks are placed on records to be only read by the current transaction, and write locks are placed on the records to be modified by the current transaction.

Once the records to be accessed by the current transaction are locked, in step 43 the records are fetched either from the state memory cache (29 in FIG. 1) or from non-volatile state memory (26 in FIG. 1) if absent from the cache. When a record is fetched from the non-volatile memory, it is transferred to the state memory cache (29 in FIG. 1) and indexed in the hash table index (30 in FIG. 1). Next, in step 44, records in volatile state memory that are to be modified by the current transaction are written to the "before-image" log. Next, in step 46, the records are modified in accordance with updates of the transaction.

A number of such modifications may be logged in the after-image log and made in non-volatile memory records, and a number of other transactions may begin, until a transaction Ty is ready to be committed, as found in step 47. Then, in step 48, the records modified by the transaction Ty are written into the non-volatile state memory 28. Next, in step 49, a "commit Ty" record is written to the before-image log for the case in which a single before-image log is used, or else for the preferred case in which a separate before-image log file is used for each process, the before-image log file for the process of the Ty transaction is truncated. In step 50, the lock manager is called to release the locks on the records accessed by the transaction Ty. Finally, in step 51, execution branches back either to step 40 to start a new transaction, or to step 41. In step 41, execution branches to step 42 if more data records are needed by the transactions, or to step 46 to continue the execution of transactions.

In steps 41, 46, 47 and 51, the operating system program time-shares execution among the multiplicity of transactions that were each begun in steps 40 to 44 and not yet committed in steps 48 to 50. The operating system may also decide to abort a selected transaction, which entails terminating processing for the selected transaction and releasing any locks imposed by the transaction, without committing the results of the transaction to state memory.

Figure 3:
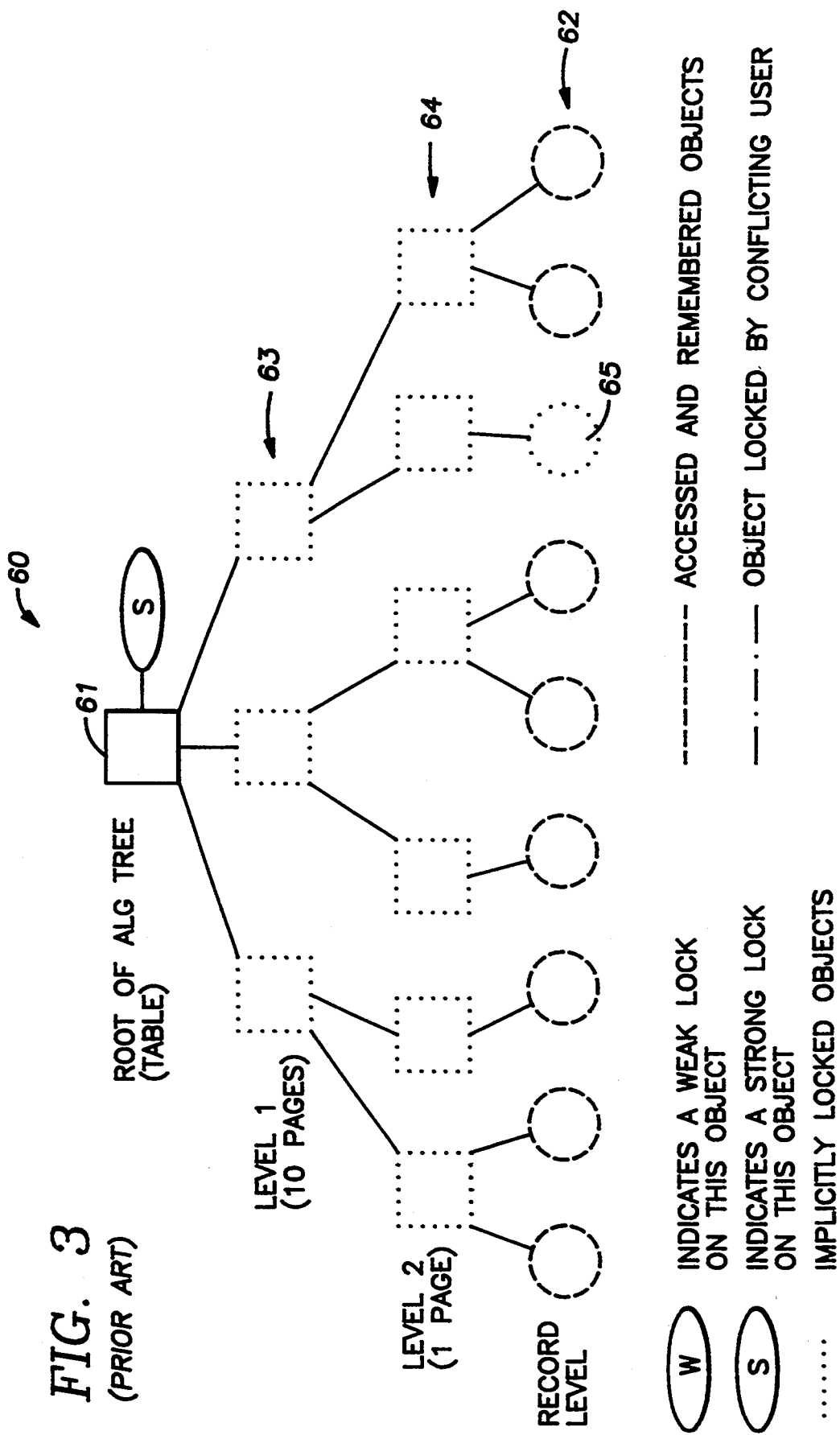
FIG. 3 is a schematic diagram of a lock hierarchy.

Turning now to FIG. 3, there is shown a schematic diagram of an adjustable lock granularity tree generally designated 60, which is used for organizing records of a table into a hierarchy. The adjustable lock granularity tree, for example, corresponds to a named data base table. The adjustable lock granularity tree has a top level or root node 61 for locking the entire table, and a number of smallest addressable storage locations, called records, at a lowest record level 62.

The adjustable lock granularity tree may have a number of intermediate levels at which there are defined disjoint sets of records which together include all of the records in the adjustable lock granularity tree. The adjustable lock granularity tree, for example, has a lower level 64 of single pages, including all contiguous records on each page, and a higher level of all records included in groups of ten contiguous pages. Additional levels of groups of 100 pages and groups of 1,000 pages could be used in hierarchies for large tables. The highest or "root" level 61 includes all of the records in the table.

The primary reason for the hierarchical structure of the adjustable lock granularity tree is to permit a single explicit lock to be placed over a plurality of records. If a single "strong" lock can be placed at a high level in the adjustable lock granularity tree, then the locking overhead, in terms of memory and processing time, is greatly reduced. The reduction occurs at the expense of the concurrency, because the high level strong lock will more easily conflict with other users than a low level lock.

It is sometimes difficult for the optimum level of a lock to be predetermined before the time that a transaction begins. Therefore, various techniques have been used that dynamically change the granularity of locking. One technique, known as lock de-escalation, starts with coarse granularity, and refines the granularity in response to locking requests by conflicting users. As shown in FIG. 3, for example, whenever a record lock is requested, the locking protocol attempts to acquire a strong lock on the highest possible ancestor of the record in the adjustable lock granularity tree. If it succeeds in obtaining the strong lock, all descendants of that node are implicitly locked. In FIG. 3, all but a single record 65, for example, has been accessed, and all of the records are locked by a single "strong" lock on the root of the adjustable lock granularity tree. It is necessary to remember the implicitly locked records in order to permit de-escalation at a later time if another transaction requests de-escalation.

Turning now to FIG. 4, there is shown the final state of the adjustable lock granularity tree 60 after a conflicting user accesses the remaining record 65. The single strong lock at the root node 61 in FIG. 3 has been de-escalated to ten-page groups 66 and 67, and a page 68. The second transaction, which is the conflicting user, has placed a strong lock on the table 69 which includes the record 65.

The present invention more particularly concerns a hybrid de-escalation/escalation method of maintaining locks on objects in the adjustable lock granularity tree. The present invention is characterized by the escalation of implicit locks on accessed and remembered objects so as to permit de-allocation of the memory used for remembering the accessed objects at lower levels in the hierarchy. This reduces the memory overhead associated with remembering accessed objects.

Memory allocation is a well-known technique widely used when "instantiating" hierarchical data structures. An "instantiation" of a hierarchical data structure is created by allocating memory for individual nodes, and then linking the nodes by setting values for pointers to the nodes. Each node, for example, includes a pointer to its parent node in the hierarchy, and a respective pointer to each of its children. To allocate memory for an individual node, a pointer to a free block of memory is obtained from a list of free pointers. Such a list of free pointers is organized as a stack or a queue such as a double-linked list. When the memory of a node is deallocated, the pointer to its respective block of memory is placed back in the free-pointer list.

Figure 5A:
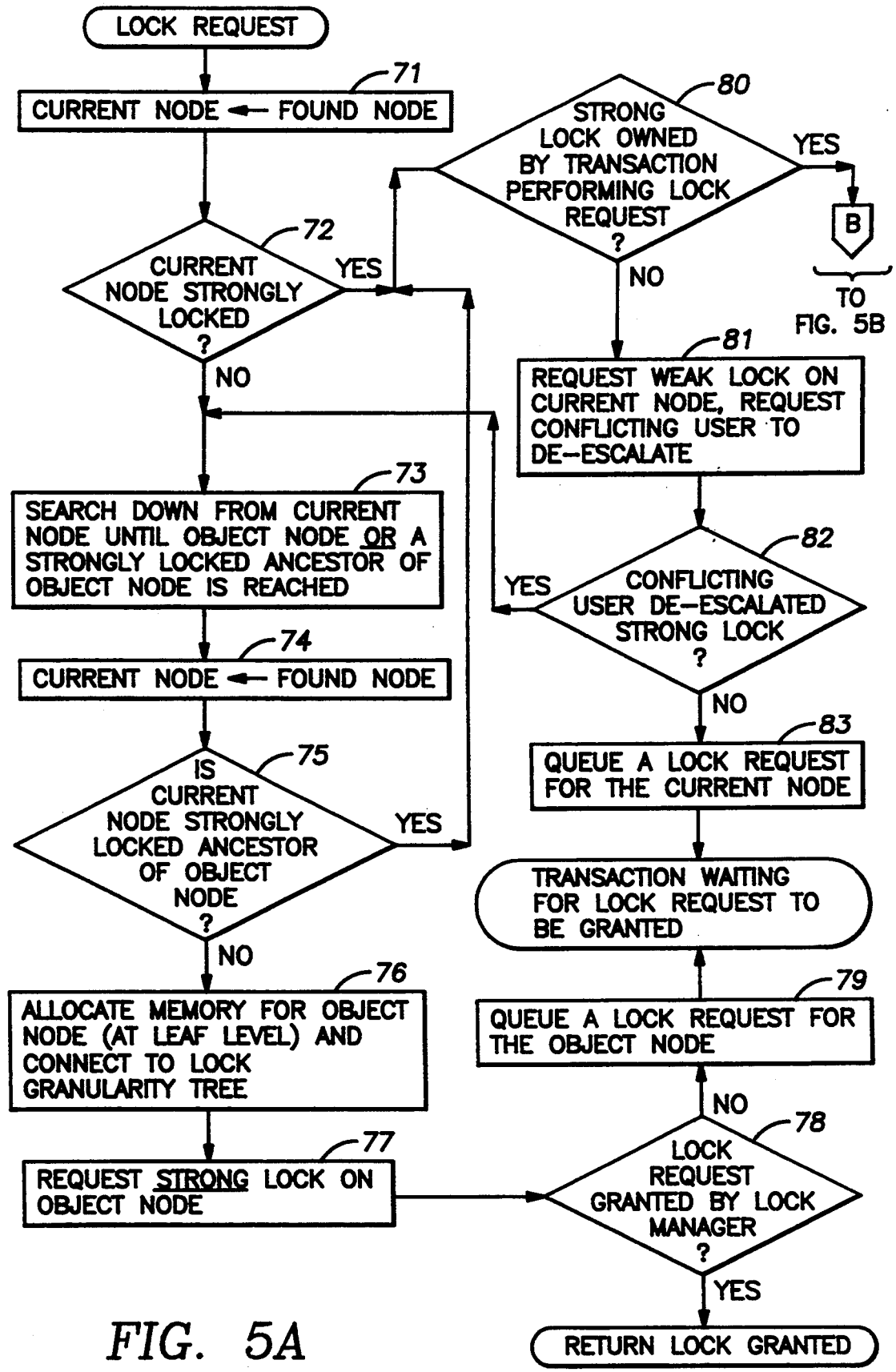
FIGS. 5A and 5B together comprise a flowchart of the basic steps for acquiring locks in accordance with the present invention.
Figure 5B:
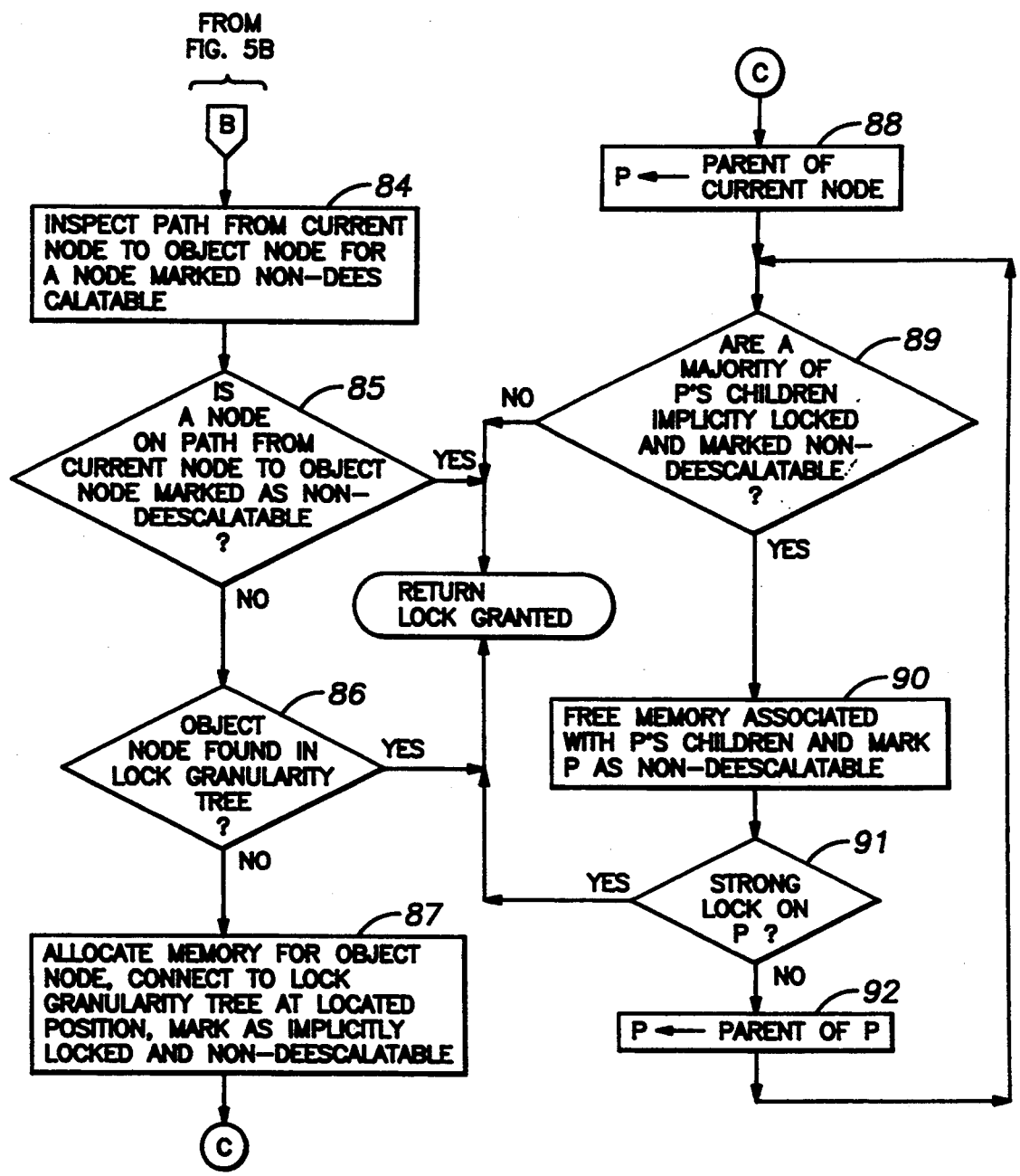
Figure 6:
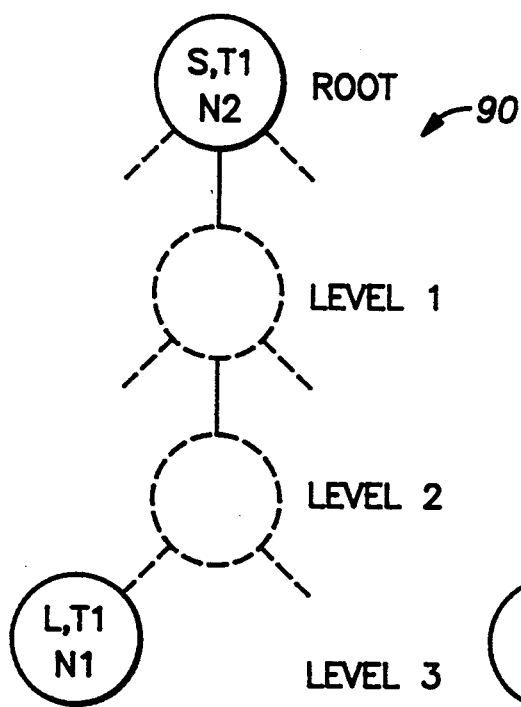
FIG. 6 is a schematic diagram of a lock hierarchy instance graph after a first lock request.
Figure 7:
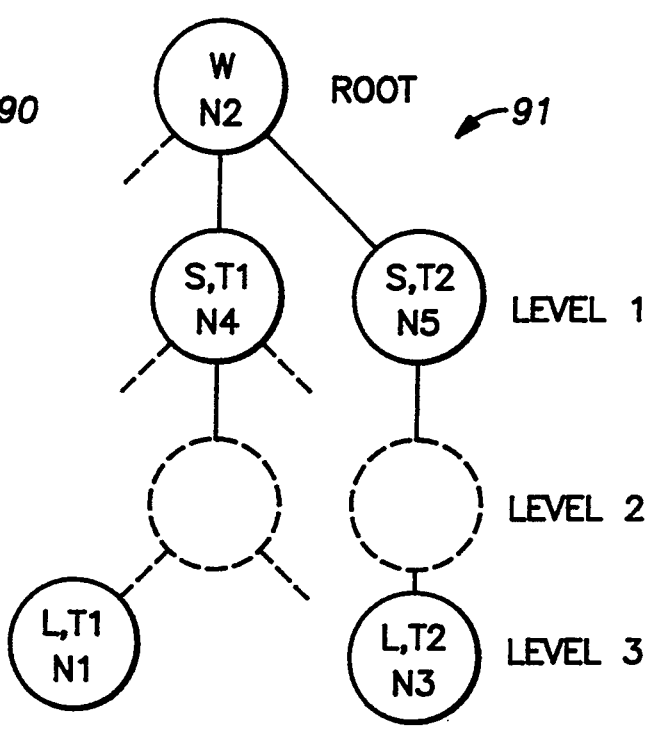
FIG. 7 is a schematic diagram of the lock hierarchy instance graph of FIG. 6 after de-escalation is performed to accommodate a second lock request.
Figure 8:
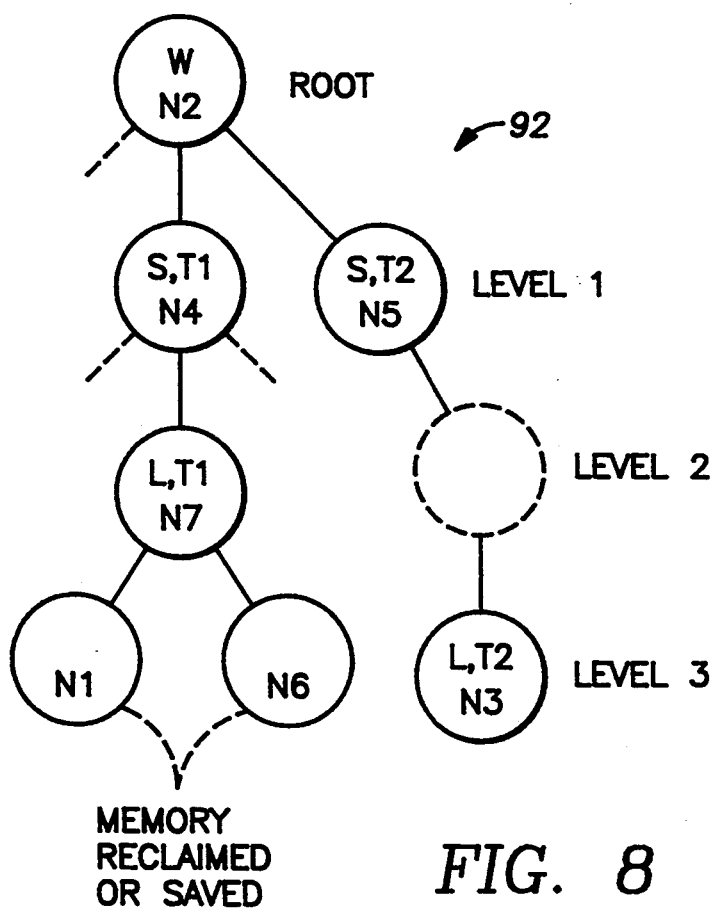
FIG. 8 is a schematic diagram of the lock hierarchy instance graph of FIG. 7 after escalation is performed in accordance with the present invention.

Turning now to FIGS. 5A and 5B, there is shown a flowchart of a procedure for acquiring locks in accordance with the present invention. It is assumed that a request for a lock on an object is either conflicting or entirely compatible with an existing lock on the object. In other words, subtleties of different "access modes" or kinds of locks are not apparent from the flowchart of FIGS. 5A and 5B. It is also assumed that a lock is requested for a specified object in a lock hierarchy granularity tree. It is further assumed that locking information is stored in an instantiation of the lock hierarchy granularity tree. The instantiation will be referred to as the "lock hierarchy instance graph." Respective states 90, 91, 92 of this lock hierarchy instance graph are shown in FIGS. 6, 7, and 8. These states occur at three different points in time as a particular sequence of lock requests are sequentially processed in accordance with the protocol specified by the flowchart of FIGS. 5A and 5B.

In the first step 71 of FIG. 5A, a pointer to the current node is assigned a value pointing to the root node of the lock hierarchy instance graph. Then, in step 72, execution branches if the current node is strongly locked. Assuming that the current node does not have a strong lock, then execution continues in step 73, where the lock hierarchy instance graph is searched for the object specified by the lock request. If the object would reside in a portion of the graph not yet instantiated, then that portion of the graph is instantiated during the search. The search begins at the root node and continues in a top-down fashion. Either the tree traversal ends at a strongly locked node which is an ancestor of the object being locked, or the search may terminate at the object node itself because the object is being re-locked by the same transaction or the traversal locates the position where the new object node will be connected to the lock granularity tree. Only the relevant portions of the lock granularity tree need be instantiated in response to lock requests. (As denoted in step 76, for example, only certain cases result in instantiating nodes.)

Next, in step 74, the current node pointer is advanced to the node found by the search in step 73. Then, in step 75, execution branches depending on whether the node found is a strongly locked ancestor of the object node.

Assume, for example, that initially there are no locks on any object in the data structure represented by the hierarchical instance graph, and then a lock on a lower node N1 is requested by a transaction T1. In this case, execution continues to step 76, where memory for the object node (at leaf level) is allocated and connected to the instantiation of the lock granularity tree. Next, in step 77, the lock manager is requested to place a strong lock on the object node. If the lock manager cannot grant the request, for example because some other transaction has a strong lock on the object node, then a lock request is queued for the object node in step 79, and the transaction must wait for the request to be completed. If the lock manager can grant the request, then it attempts to place a lock at the highest possible level in the lock granularity tree. If there are any non-conflicting ancestor nodes of the specified object, then a strong lock request is placed on the highest such non-conflicting ancestor node; otherwise, the lock is placed on the object node. Because initially there are no locked nodes, the root node is the highest such ancestor node in the instance graph, and a strong lock on the root node would not conflict with any other lock. Therefore, in step 78, a strong lock is placed on the root node, and the object node is marked as a non-de-escalatable "leaf" node, and execution returns.

The state 90 of the lock hierarchy instance graph at this time is shown in FIG. 6. The node N1 at level 3 is marked as a leaf node (L) and shown as implicitly locked for transaction T1. The root node N2 is marked as having a strong lock (S) for the transaction.

Returning now to FIG. 5A, assume that the protocol of FIG. 5A next processes a second request for a different transaction T2 for a conflicting lock on an object at a node N3 at a leaf level 3 in the hierarchy. In this case, execution will branch from step 72 to step 80 because the root node is strongly locked for the first transaction T1. In step 80, execution will continue from step 80 to step 81 because the strong lock is not owned by the transaction performing the lock request. In step 81, a process of de-escalation is attempted by requesting the lock manager to place a weak lock on the current node and request the conflicting user to de-escalate. If in step 82 the conflicting user refuses to de-escalate, then execution continues in step 83, where a lock request for the current node is queued, and the transaction waits for the request to be completed. Assume, for example, that transaction T1 de-escalates for T2 by permitting its strong lock on the root node N2 to be deescalated to a node N4 at level 1. Then execution branches from step 82 back to step 73. Assuming that the root node is the highest common ancestor of T1 and T2, then execution would proceed with steps 73 to 78 to grant the lock request for T2. Step 76 would allocate memory for node N3 and step 77 would place a strong lock on a node N5 at level 2, because node N5 would be the highest ancestor of N3 that would not conflict with the strong lock of T1 on node N4. The state of the lock hierarchy instance graph at this point is shown in FIG. 7.

In the general case, even if de-escalation is permitted in step 81 so that execution branches from step 82 back to step 73, it might not resolve the conflict. Conflict can be avoided only if there is a descendant to which the lock can be de-escalated and that descendant is neither N3 nor an ancestor of node N3, but is an ancestor of (or is the only) conflicting implicitly locked descendants of the root node. In other words, in step 81, the conflicting user might de-escalate to a lower node, but that lower node still might be an ancestor of N3. In this case, execution would branch from step 75 back to step 80, possibly a number of times, until the conflicting user could no longer deescalate, for example because a leaf node would be reached for the conflicting user. Then in step 83 the lock request would be placed on a wait queue for this leaf node, and the transaction would have to wait. When the strong lock on the leaf node would be released (for example, when the conflicting user transaction is committed or aborted), the wait queue would be used to reinitiate processing of the request.

Returning to FIG. 5A, assume that the first transaction T1 now requests a lock on a leaf-level object at a node N6. In step 73, the lock hierarchy instance graph is searched beginning with the root node N2, until it is found that the node N4 has a strong lock. Execution then branches from step 75 to step 80. In step 80, there is no conflict because the strong lock S was set for the same transaction T1. Execution therefore branches to step 84 in FIG. 5B.

In step 84 of FIG. 5B, the path from the current node to the object node is inspected, for example by a downward search, to determine whether the path includes a node marked non-deescalatable. Such a node would already hold an implicit lock over the object, so that there would be no need for allocating memory for holding an implicit lock for the object node, and therefore in this case execution returns from step 85 with the lock request granted with no additional work or resource expense. Such a node may exist after implicit lock escalation occurs, as will be described below with reference to steps 88 to 92.

Assuming now that N1 and N6 are different nodes at level 3 and there is no such node marked non-deescalatable on the path to the object node, execution continues from step 85 to 86. Step 86 checks for the case where the object node is already in the lock hierarchy instance graph, which could occur if the object is being re-locked. Therefore, in this case execution returns with the lock granted, without any need for allocating additional memory for the object node. Otherwise, execution continues in step 87 where memory is allocated for the object node, and the object node is connected to the lock hierarchy instance graph at its lowest ancestor in the graph. Step 87 could be deferred until after attempting implicit lock escalation in which case step 87 would not be done if implicit lock escalation is successful, but for simplicity of implementation step 87 is not deferred in the procedure of FIG. 5B.

Escalation of implicit locks is attempted in steps 88 and 89 and performed in step 90. In step 89 a pointer P is set to point to the parent of the current node. Then in step 89, the number of children of the parent of the current node is inspected to determine whether to begin implicit lock escalation. Escalation should be performed if more than a predetermined number of the children of the parent node are marked as leaf nodes. For example, if a majority of the children of the parent of the current node are marked as locked leaf nodes, then execution branches to step 90, where escalation begins; otherwise, execution returns with the lock granted. In step 90, escalation is performed by de-allocating the memory of the children, and marking the parent node as non-deescalatable. Escalation of the implicit lock on the parent node is attempted so long as there is not a strong lock on the parent node, as tested in step 91. If there is a strong lock on the parent node, execution returns with the lock granted. Escalation of implicit locks is not attempted on a strong locked node because the strong lock is maintained on the highest non-conflicting ancestor node in the lock hierarchy instance graph. If there is not a strong lock on the parent node, then in step 98 the current node pointer is set to the parent node, and execution branches back to step 89 to attempt escalation to the next higher level.

Eventually escalation terminates after step 89 or step 91 with the lock granted. In the example where nodes N1 and N6 are children of node N7, and the lock granularity tree defines only these two children for node N7, an implicit lock on node N6 would cause node N7 to have a majority (in fact all) of its children implicitly locked for transaction T1. Therefore, these implicit locks are escalated to T1, and T1 is marked as deescalatable. The state 92 of the lock hierarchy instance graph at this time is shown in FIG. 8.

It should be apparent from the above description of the basic protocol of FIGS. 5A and 5B that there are various design choices for a specific embodiment of the present invention. The protocol of FIGS. 5A and 5B, for example, assumes in step 90 that memory of all children should be de-allocated and all implicit locks of the children of the parent should be subsumed by the parent. This is a good assumption so long as all non-conflicting locks are owned by the same transaction. Alternatively, the implicitly locked nodes of accessed and remembered objects (i.e., the nodes marked with (L) but not (S) in the FIGS. 6 to 8) could store information identifying the transactions accessing the objects. This alternative arises in practice, for example, because a strong "read lock" on an object typically can be owned by more than one transaction. If a specific embodiment permits strong locks on objects to be owned by more than one transaction, then it may be desirable for the implicitly locked nodes to store information identifying the transaction or transactions owning the implicit locks.

Consider, for example, the steps in FIGS. 5A and 5B which should consider whether or not a particular lock or accessed and remembered object is owned by a particular transaction. The search in step 72 is looking for a strong lock which might be owned by any transaction, while the search in step 84 and the escalation in steps 88 to 92 are being performed with respect to only the transaction that requested the lock. Therefore it may be desirable to instantiate a separate lock hierarchy instance graph with respect to each transaction, and steps 84 to 92 would operate with respect to the lock hierarchy instance graph of the transaction whose lock request is being processed. A separate lock hierarchy instance graph for each transaction would also simplify de-allocation of memory when the transaction commits, because the entire lock hierarchy instance graph for the transaction would be de-allocated when the transaction commits.

The search in step 73 must consider strong locks owned by any transaction, which suggests that step 73 should be performed on a graph that is not owned by any particular transaction. However, if a conventional lock manager facility were used to resolve the conflict between various access modes, then the conventional lock manager facility could simply be called at each node in the adjustable lock granularity tree during the downward search in step 73 to determine whether or not there is a strong lock on each node. Therefore, step 73 could be performed by searching a separate hierarchical lock instance graph for the particular transaction requesting a lock, and each node in that graph could include a descriptor to the conventional lock manager facility. Initially the descriptor would be zero, but if the conventional lock manager facility were invoked to inquire about the lock status of the node and if the node were locked, then the descriptor would be set to an argument returned by the conventional lock manager and pointing to the lock manager's lock information for that node. Therefore, if the transaction would later need to inquire about the lock status of the same node, the status could be obtained more quickly by using the descriptor.

De-escalation in step 82 must consider both the strong locks and the implicitly remembered objects of all transactions. This suggests that the strong locks should serve as the linking points for linking together any separate data structures for each transaction. Therefore, if a conventional lock manager facility is invoked to obtain the lock status of a node and the node has a strong lock, the conventional lock manager facility should return a list of pointers indicating the transactions which own the strong lock. These pointers could be used to access information about the accessed and remembered objects for each transaction owning the lock, in order to determine whether de-escalation may resolve a conflict.

Appended to at the end portion of the present specification is a pseudo-code listing of a specific computer program illustrating the present invention. This computer program generates a separate lock hierarchy instance graph for each transaction.

Consider again the example of FIGS. 6 to 8, but this time assuming that each transaction creates or modifies a respective lock hierarchy instance graph when it obtains locks on resources in the hierarchy. The lock hierarchy instance graph 90 is created by transaction T1 when T1 obtains a lock on N1.

Figure 9A:
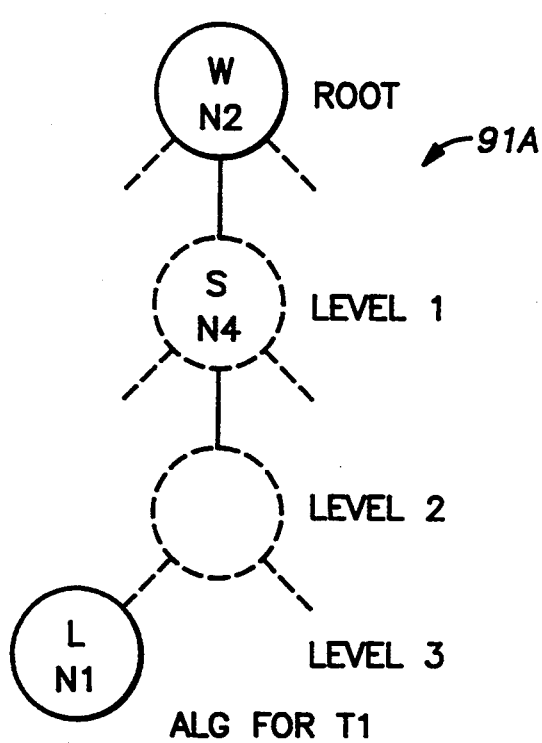
FIGS. 9A and 9B are schematic diagrams of respective lock hierarchy instance graphs for a first and a second transaction, and which together represent the same information represented by the lock hierarchy instance graph of FIG. 7.
Figure 9B:
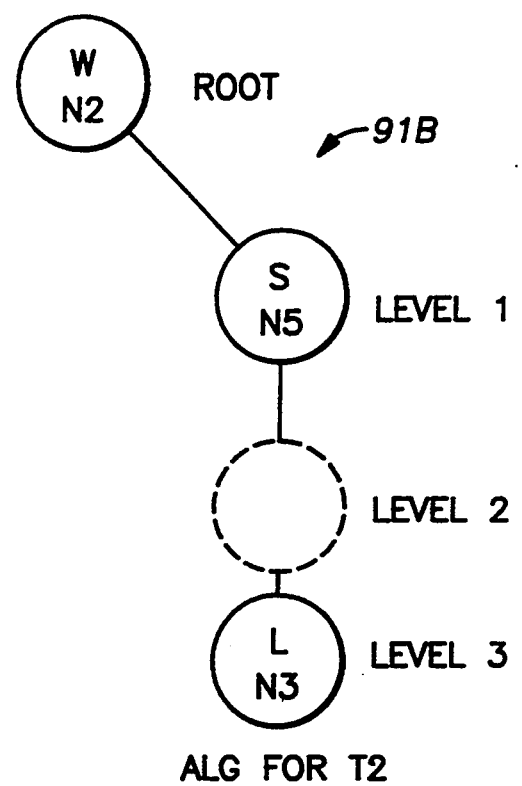

When transaction T2 obtains a lock on node N3, the lock hierarchy instance graph for T1 is modified to arrive at the graph 91A in FIG. 9A and another graph 91B is created for T2 as shown in FIG. 9B. The combination of the graphs 91A and 91B in FIGS. 9A and 9B include the same information as the graph 91 in FIG. 7.

Figure 10:
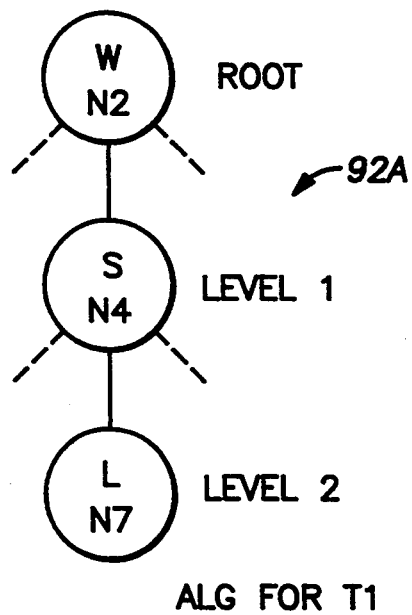
FIGS. 10 is schematic diagram of the lock hierarchy instance graph for the first transaction, which when combined with the lock hierarchy instance graph in FIG. 9B for the second transaction, corresponds to the lock hierarchy instance graph of FIG. 8.

When transaction T1 escalates the implicit lock on N1 to N7, the lock hierarchy instance graph for T1 is modified to arrive at the graph 92A in FIG. 10. The lock hierarchy instance graph 91B for T2 need not be modified. The combination of the graphs 92A in FIG. 10 and the graph 91B in FIG. 9B include the same information as graph 92 in FIG. 8.

Figure 11:
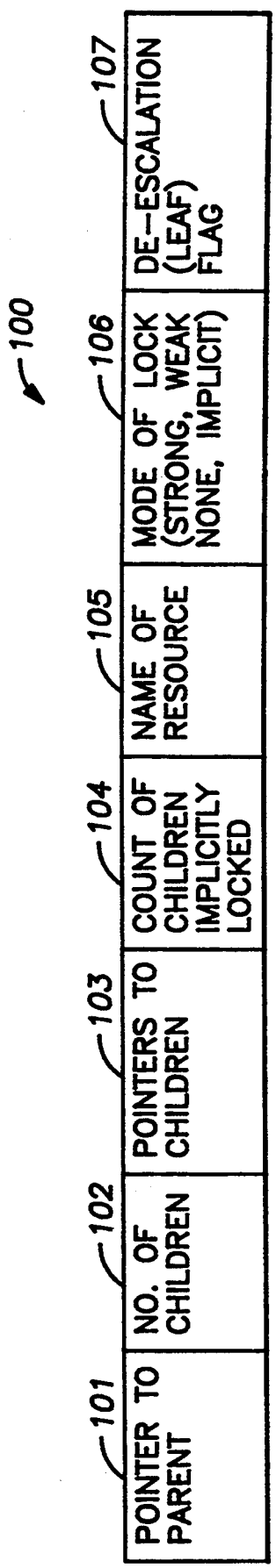
FIG. 11 is a schematic diagram of information stored for each node in a lock hierarchy instance graph for a particular transaction.

Turning now to FIG. 11, there is shown a schematic diagram of a format for storing data associated with each node in a lock hierarchy instance graph for a particular transaction. The data for each node includes information about a parent and children, such as a pointer 101 to the parent of the node, the number 102 of children of the node, pointers 102 to the children of the node, and a count 104 of the children of the node which are implicitly locked.

The data for each node further includes the name 105 of the resource that the node represents. This name could identify both the particular level and the particular node in the resource hierarchy, and the name could be coded to permit rapid identification of whether two nodes have an ancestor or descendant relationship, or to find the most direct common ancestor in order to facilitate de-escalation, by a comparison of the names. Each node, for example, is identified a list of numbers, each of which indicates the path through the resource hierarchy from the root to the node. The ancestor or descendant relationship between two nodes is therefore indicated by matching numbers in the list, and the most direct common ancestor is identified by a string of matching numbers.

The data for each node further identifies the mode 106 of any lock on the node, for example, whether there is a lock on the node, and whether the lock is strong, weak, or implicit. Finally, the data for each node includes a "leaf" flag 107 indicating whether de-escalation of the node is possible. At the start of a transaction, all nodes have an initial or default value of TRUE for the "leaf" flag, except the nodes at the lowest level in the resource hierarchy (i.e., the record level for the hierarchy in FIG. 3) have an initial or default value of FALSE.

Figure 12:
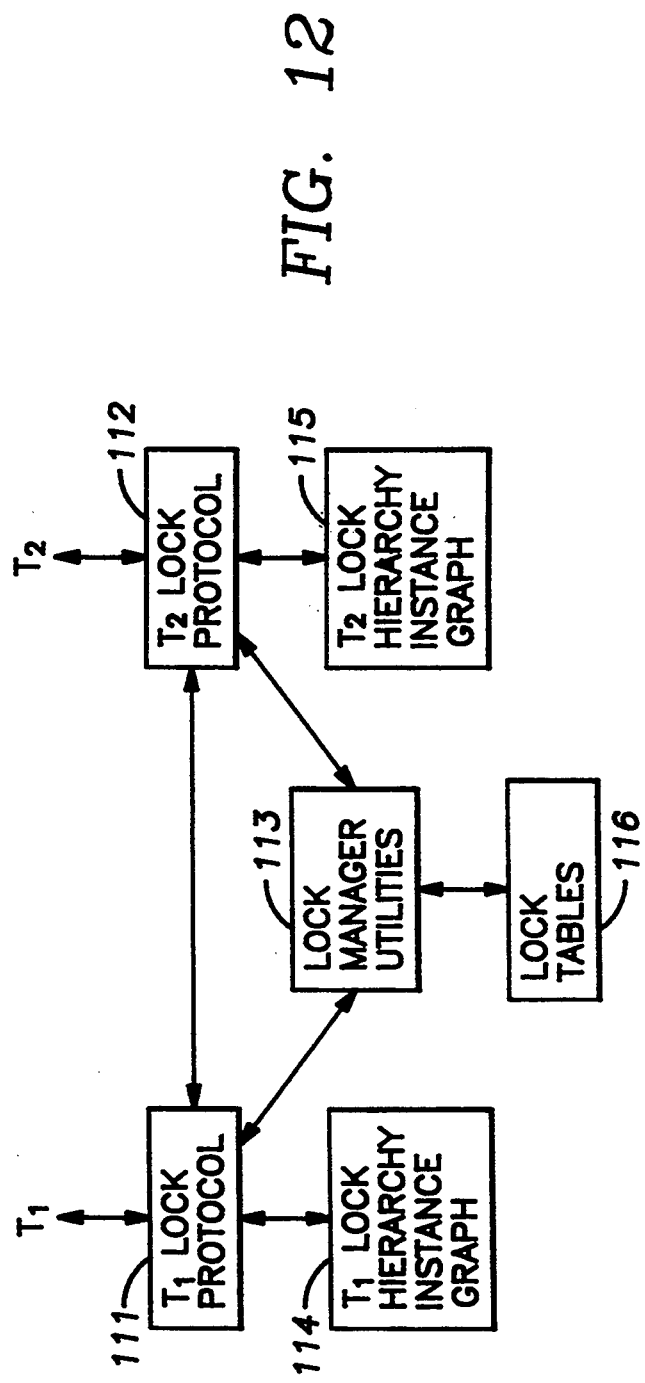
FIG. 12 shows a schematic diagram of a preferred embodiment of the invention that is further illustrated by a computer program listing included in the end portion of the specification.

Turning now to FIG. 12, there is shown a schematic diagram of the preferred embodiment of the invention, as described in detail by a computer program listed below. Each transaction has a respective lock hierarchy instance graph, which could be quite different for each transaction. The lock protocol 111, 112 for each transaction checks for conflict with locks owned by other transactions by calling lock manager utilities 113, and creates and maintains the lock hierarchy instance graph for the transaction. The lock protocol 111 for transaction T1 creates and maintains the lock hierarchy instance graph 114, and the lock protocol 112 for transaction T2 creates and maintains the lock hierarchy instance graph 115. In this fashion, each transaction can manipulate an entirely different lock hierarchy instance graph.

In the preferred embodiment of FIG. 12, the lock manager utilities 113 are entirely distinct from the lock protocols 111, 112 for the respective transactions T1, T2. The lock manager utilities 113 have the responsibility for maintaining the locks on the resources. The locks, for example, are maintained in lock tables 116.

The lock manager utilities 113 comprise a set of primitives for acquiring and releasing locks on specified resources. The lock manager utilities 113 provide a set of lock nodes with predefined conflict and compatibility characteristics. In particular, the lock manager utilities 113 grant lock requests, determine lock request conflicts among concurrent users, manage conflicts by blocking incompatible requests until the resource becomes available, and manage the allocation of lock requests in a fair manner. The lock manager utilities 113 do not implement concurrency control protocols but provide primitives used by the concurrency control protocols. The lock manager utilities 113 may also provide asynchronous notification primitives to notify conflict to those transactions or users who are currently holding locks that are blocking concurrent lock requests. These asynchronous notification primitives are also called blocking notification primitives.

In the preferred embodiment defined by the following computer program listing, it is assumed that blocking notification primitives are provided by the lock manager utilities 113, or are implemented by other operating system notification primitives. It is also assumed that record locking follows the conventional two-phase record locking protocol such that one a record is locked, it cannot be unlocked until the transaction terminates. Moreover, the computer program includes a "lock record" function and a "de-escalation" function, and it is assumed that both functions are executed such that they will not be interrupted while being executed; any pending notifications will be delivered as soon as the routine exits.

The following computer program is written in a pseudo-Pascal like language. The symbol "--" indicates comments. Comments enclosed in [,] indicate a new state. The symbol ":=" indicates an assignment to a variable, "=" indicates an equality comparison, and "<>" indicates an inequality comparison.

```
function lock__record (R, X); -- lock record R in table X
    begin
    -- initialization step
    H := the resource hierarchy for table X;
    -- start at the hierarchy root
    T := root of hierarchy H;
    loop
        -- attempt to acquire a strong ancestor lock that will
        -- dominate record R
        request a STRONG EXPLICIT lock on T;
        if this request succeeds then begin
```

-continued

```
-- determine all the nodes that are on the path
-- from T to R
A := set of nodes in resource hierarchy that are
    ancestors of R AND descendants of T;
for each member of A do
    if de-escalation flag is set to FALSE then begin
        this request is trying to re-lock
        -- a record R that was previously locked;
        [implicit escalation was
        performed earlier]
        return success; - R is implicitly locked
    end-if
end-for
-- [None of the ancestors of R are de-escalatable;
-- however, the next sequence of steps may possibly
-- result in changing some ancestors to non-de-
--escalatable]
acquire a STRONG IMPLICIT lock on record R;
[NOTE: de-escalation flag in R is set to FALSE]
attempt implicit escalation.
P := parent of R;
while P<>T do begin
    Examine P to see if implicit escalation
    is possible;
    D := all children of P;
    If every member of D has the de-escalation flag
    set to FALSE then begin
        -- implicit escalation is possible
        Set the de-escalation flag in P to FALSE;
        acquire A STRONG IMPLICIT lock on P;
        release all implicit lacks for P's children;
        -- this releases all the memory associated
        --with members of D
    end-if
    -- attempt implicit escalation step at next
    --higher level
    P := parent of P;
end-while;
return success
end-if
-- failed to acquire a STRONG EXPLICIT lock on T
-- since a conflicting user Uc is holding a strong lock
-- on T;
-- Signal Uc to ATTEMPT TO perform de-escalation by
-- generating a blocking notification to Uc.
invoke the blocking notification primitive to notify Uc;
-- [Uc has attempted the de-escalation step described below]
request a WEAK EXPLICIT lock on node T;
if this request fails then begin
    -- Uc was unable to perform de-escalation
    -- this indicates that all descendants of T
    -- (including R)are locked by Uc. In this case,
    -- the lock request for record R cannot be
    --satisfied.
    return failure;
end-if
    -- [Uc succeeded in de-escalating the locks
    -- on resource T]
    else begin
        -- [we have a WEAK EXPLICIT lock on T]
        if T is a parent of record R then begin
            request a STRONG EXPLICIT lock
            on R;
            if the request succeeds then begin
                -- we succeeded in lock
                -- record R
                return success;
            end-if
            -- [R is locked by a conflicting user]
            else begin
                return failure;
            end-else
        end-if
        else-begin
            -- try to acquire a strong lock at the
            -- next lower level in the resource
            -- hierarchy. [conflicting users have
            -- performed de-escalation]
            T := child of T that is ancestor of R;
        end-else
    end-loop;
end-function; -- lock-record
```

```
function de-escalation (Z);
-- this function is invoked in response to a blocking
-- notification from a conflicting user.
-- Z is the resource which we will attempt to de-escalate
-- Z may be an internal node or a leaf node in a record resource
-- hierarchy
-- [Z has a STRONG EXPLICIT lock on it]
begin
    H := resource hierarchy for Z;
    if the de-escalation flag for Z is FALSE then begin
        -- de-escalation is not possible;
        -- there is nothing to do
        return; -- still holding STRONG EXPLICIT lock on Z
    end-if
    else begin
        -- [Z is de-escapable]
        C := Set of children of Z having implicitly locked
            descendants;
        request STRONG EXPLICIT locks on all members of C;
        -- The above request must succeed since Z has a STRONG
        -- EXPLICIT lock
        -- The only reason this can fail is that the lock
        -- manager ran out of resources and hence denied the
        -- request
        if all members of C have STRONG EXPLICIT locks then
        begin
            request demotion to a WEAK EXPLICIT lock on Z;
            -- since the only lock on resource Z is a STRONG
            -- EXPLICIT lock, this demotion request must succeed.
            -- [All members of C are strongly locked;
            -- de-escalation step succeeded]
            return; -- holding WEAK EXPLICIT lock on Z
        end-if
        else begin
            [At least one member of C is not strongly locked;
            de-escalation cannot be performed]
            return -- still holding STRONG EXPLICIT lock in Z
        end-else
    end-else
end-function; -- de-escalation
```

In view of the above, there has been described a lock protocol that follows a hybrid lock escalation/de-escalation protocol. Lock de-escalation is triggered by contention from conflicting users. This reduces the number of locks requested per transaction in a multi-user environment. Lock escalation is triggered when a substantial number of children have compatible implicit locks. The resource hierarchy is dynamically restricted during lock escalation to free memory space. Therefore, concurrency control, with reduced contention, is provided in a very large database environment. Database scans on very large tables of records can be handled with reduced memory requirements.

What is claimed is:

1. A method of operating a digital computer for processing requests for memory locks upon nodes of a predefined resource hierarchy of addressable memory of said digital computer, wherein a pre-existing lock on a node precludes a granting of a subsequent request for a conflicting lock on the node until the pre-existing lock is released, said resource hierarchy having a multiplicity of levels, said method comprising the steps of:

a) responding to a first request for a memory lock upon a first node at a lower level in said resource hierarchy by placing a memory lock on a higher-level second node in said resource hierarchy that is an ancestor of the first node, and recording in memory a leaf-node instance for said first node;

b) responding to a second request for a memory lock upon a third node at a lower level in said resource hierarchy than said second node by detecting a lock conflict between the lock requested by the second request and said lock on said second node, de-escalating the lock on the second node to a lower-level fourth node which is a descendant of said second node and an ancestor of said first node but not an ancestor of said third node to avoid conflict with the lock requested by the second request;

c) responding to a third request for a memory lock upon a fifth node at a lower level in said resource hierarchy that is at the same level as said first node by escalating said leaf-node instance from said first node to a sixth node in said resource hierarchy that is an ancestor of both of said first and fifth nodes and is not an ancestor of said fourth node; and d) responding to a fourth request for a lock upon a seventh node at a level in said resource hierarchy that is lower than the level in said resource hierarchy of said sixth node by detecting a lock conflict between the lock requested by said fourth request and the lock on said fourth node, and denying said fourth request upon detecting that said sixth node has a leaf-node instance, thereby prohibiting de-escalation of the lock on the fourth node to below said sixth node.

2. A method of operating a digital computer for processing requests for memory locks upon nodes of a predefined resource hierarchy of addressable memory of said digital computer, wherein a pre-existing lock on a node precludes a granting of a subsequent request for a conflicting lock on the node until the pre-existing lock is released, said resource hierarchy having a multiplicity of levels, said method comprising the steps of:

a) responding to a first request for a memory lock upon a first node at a lower level in said resource hierarchy by placing a memory lock at a higher-level second node in said resource hierarchy that is an ancestor of the first node, and recording in memory a leaf-node instance for said first node;

b) responding to a second request for a memory lock upon a third node at a lower level in said resource hierarchy that is at the same level as said first node by escalating said leaf-node instance for said first node to a fourth node in said resource hierarchy that is an ancestor of both of said first and third nodes; and c) responding to a third request for a lock upon a fifth node at a level in said resource hierarchy that is lower than the level in said resource hierarchy of said fourth node by detecting a lock conflict between the lock requested by said third request and said lock on said second node, and denying said third request upon detecting that said fourth node has a leaf-node instance, thereby prohibiting de-escalation of the lock on the second node to a level lower than said leaf node instance.

3. The method as claimed in claim 2, further comprising the step of responding to a fourth request for a memory lock upon a sixth node at a lower level in said resource hierarchy than said second node by detecting a lock conflict between the lock requested by the fourth request and said lock on said second node, de-escalating said lock on said second node to a lower-level seventh node which is a descendant of said second node and an ancestor of said fourth node but not an ancestor of said sixth node to avoid conflict with the lock requested by the fourth request, and placing a lock on an eighth node which is a descendant of said second node and an ancestor of said sixth node but not an ancestor of said seventh node.

4. A method of operating a digital computer for processing requests for memory locks upon nodes of a predefined resource hierarchy of addressable memory of said digital computer, wherein a pre-existing lock on a node precludes a granting of a subsequent request for a conflicting lock on the node until the pre-existing lock is released, said resource hierarchy having a multiplicity of levels, said method comprising the steps of:

a) responding to a first request for a memory lock on a first node in a previously unlocked portion of the resource hierarchy by recording that said first node is non-de-escalatable, and placing a lock on a second node at a highest possible non-conflicting ancestor node of said first node;

b) responding to a second request for a memory lock upon a third node at a lower level in said hierarchy than said second node by detecting a lock conflict between the lock requested by the second request and the lock on said second node, removing the lock on said second node, recording that said third node is non-de-escalatable, and placing a lock on each of a pair of highest lower-level nodes, one of which is a descendant of said second node and an ancestor of the first node but not an ancestor of the third node, and the other of which is an ancestor of the third node but not the first node;

c) responding to a third request for a memory lock upon a fourth node at a lower level in said resource hierarchy than said second node by recording as non-de-escalatable a fifth node in said resource hierarchy that is an ancestor of both of said first and fourth nodes and is a descendant of one of said pair of highest level nodes; and d) responding to a fourth request for a lock upon a sixth node at a level in said resource hierarchy that is at a lower level in said resource hierarchy than said fifth node by detecting a lock conflict between the lock requested by the fourth request and said lock on said fifth node, and upon detecting that said fifth node is recorded as non-de-escalatable, denying said fourth request.

5. The method as claimed in claim 4, wherein said step a) includes allocating memory for recording that said first node is non-de-escalatable, and recording in said memory that said first node is non-de-escalatable, and said step c) includes de-allocating said memory in which said first node was recorded as non-de-escalatable.

6. The method as claimed in claim 4, further comprising the steps of searching an instantiation of said resource hierarchy when responding to each request for a lock on a specified node of said hierarchy, said searching starting from a highest-level root node in said hierarchy and continuing downward to nodes at successively lower levels until either a locked node is reached or the specified node is reached and the specified node is unlocked.

7. The method as claimed in claim 6, wherein de-escalation of the lock on the locked node found by said searching is attempted when said lock on the locked node found by said searching is found to conflict with the requested lock on said specified node.

8. The method as claimed in claim 4, wherein said method includes recording as non-de-escalatable at least a predetermined number of children of said fifth node, said recording as non-de-escalatable at least a predetermined number of children of said fifth node being performed before said step (c), and said step (c) includes checking whether said sixth node has at least said predetermined number of children that have been recorded as non-de-escalatable, and wherein said fifth node is recorded as non-de-escalatable when said checking finds that said fifth node has at least said predetermined number of children that have been recorded as non-de-escalatable.

9. The method as claimed in claim 8, wherein said resource hierarchy defines a total number of children for said fifth node, and said predetermined number of children is approximately said total number of children for said fifth node.

10. The method as claimed in claim 8, wherein said resource hierarchy defines a total number of children for said fifth node, and said predetermined number of children is a majority of said total number of children for said fifth node.

11. A digital computer comprising a memory and means for processing requests for memory locks upon nodes of a predefined resource hierarchy, wherein a pre-existing lock on a node precludes a granting of a subsequent request for a conflicting lock on the node until the pre-existing lock is released, said resource hierarchy having a multiplicity of levels, said means for processing requests for memory locks including:
   a) first means for responding to a request for a lock on a first specified node that is not locked and does not have a locked ancestor by placing a lock on a node that is in said unlocked portion of said resource hierarchy and is a highest ancestor of said first specified node, and recording that said first specified node is non-de-escalatable;
   b) second means for responding to a request for a lock on a second node having an ancestor node having a lock that does not conflict with the lock requested on the second node by checking whether the ancestor node of said second node is an ancestor of at least one node that is not said second node and that is recorded as non-de-escalatable, and when said ancestor node is found to be an ancestor of at least one node that is not said second node and that is recorded as non-de-escalatable, recording as non-de-escalatable said ancestor node of said second node;
   c) third means for responding to a request for a lock on a third node having an ancestor node having a lock that conflicts with the lock requested on the third node by checking whether said ancestor node is recorded as non-de-escalatable and whether said ancestor node has a descendent that is neither said third node nor an ancestor of said third node, and when said ancestor node is not recorded as non-de-escalatable and has a descendant that is neither said third node nor an ancestor of said third node, de-escalating the lock on the ancestor of said third node to the descendent that is neither said third node nor an ancestor of said third node.

12. The digital computer as claimed in claim 11, wherein said second means includes means for checking whether a parent node of said second node has a predetermined number of child nodes that are each recorded as non-de-escalatable, and when said parent node of said second node is found to have a predetermined number of child nodes that are each recorded as non-de-escalatable, recording said parent node as non-de-escalatable.

13. The digital computer as claimed in claim 12, wherein said resource hierarchy defines a total number of children of said parent node, and said predetermined number is approximately said total number.

14. The digital computer as claimed in claim 12, wherein said resource hierarchy defines a total number of children of said parent node, and said predetermined number is a majority of said total number.

15. The digital computer as claimed in claim 12, further comprising means for allocating memory in which nodes in said hierarchy are recorded as non-de-escalatable, and wherein said second means includes means, operative when said parent node is recorded as non-de-escalatable, for de-allocating memory in which said child nodes are recorded as non-de-escalatable.

16. The digital computer as claimed in claim 11, further comprising:
   means for searching an instantiation of said resource hierarchy when responding to a request for a lock on a specified node by starting from a highest-level root node in said resource hierarchy and continuing downward to nodes at successive lower levels until either a locked node is reached or the specified node is reached and the specified node is unlocked;
   means for activating said first means when said search terminates at said specified node and said specified node is unlocked;
   means for activating said second means when said search terminates at said locked node and said locked node has a lock that conflicts with the lock requested for the specified node; and
   means for activating said third means when said search terminates at said locked node and said locked node has a lock that does not conflict with the lock requested for the specified node.

17. The digital computer as claimed in claim 11, further comprising means for allocating memory in which nodes in said hierarchy are recorded as non-de-escalatable, and wherein said second means includes means, operative when said ancestor node of said second node is recorded as non-de-escalatable, for de-allocating memory in which said at least one node that is not said second node is recorded as non-de-escalatable.

* * * * *